United States Patent [19]

Lobert et al.

[11] Patent Number: 5,271,036
[45] Date of Patent: Dec. 14, 1993

[54] METHOD AND DEVICE FOR THE RECOGNITION OF MODULATIONS

[75] Inventors: Bruno Lobert, Bois Colombes; Bruno Sourdillat, Paris, both of France

[73] Assignee: Thomson-CSF, Puteaux, France

[21] Appl. No.: 792,913

[22] Filed: Nov. 15, 1991

[30] Foreign Application Priority Data

Nov. 16, 1990 [FR] France ............................ 90 14294

[51] Int. Cl.⁵ .............................................. H04B 3/46
[52] U.S. Cl. ....................................... 375/10; 370/13; 370/69.1; 455/226.1
[58] Field of Search ............... 375/10; 370/13, 69.1; 455/226.1

[56] References Cited

U.S. PATENT DOCUMENTS

| 4,166,980 | 9/1979 | Apostolos et al. | 375/75 |
| 4,305,159 | 12/1981 | Stromswold et al. | 455/226.1 |
| 4,398,286 | 8/1983 | Geesen et al. | 370/69.1 |

Primary Examiner—Curtis Kuntz
Assistant Examiner—T. Ghebretinsae
Attorney, Agent, or Firm—Oblon, Spivak, McClelland, Maier & Neustadt

[57] ABSTRACT

A method for recognizing modulation of radioelectric transmissions from instantaneous spectra of transmission observed in a determined frequency band by a Fast Fourier Transform spectrum analyze is disclosed wherein the method involves the calculation of a plurality of parameters for each transmission spectrum line which is observed. The parameters include the calculation of a mean amplitude of all the line k of the spectrum contained in the determined frequency band and the calculation of a signal-to-noise ratio as well as a standard deviation in amplitude of each lines of the spectrum. Also calculated is a coefficient of correlation COR(k,k) of amplitude of each line k with the homologous lines of the transmission spectrum contained in the determined frequency band. Subsequently, a comparison is made, through a network of neurons, of the parameters of each transmission spectrum with expected transmission parameters and an indication is made as to a correspondence between a transmission and an expected transmission when the difference detected by the comparison is at a minimum value.

10 Claims, 2 Drawing Sheets

METHOD AND DEVICE FOR THE RECOGNITION OF MODULATIONS

BACKGROUND OF THE INVENTION

The present invention relates to a method and device for the recognition of modulations using instantaneous spectra.

To recognize the class of modulation of several radio-electrical transmissions, there are several existing techniques such as those described, for example, in the following articles:

Friedrich JONDRAL (member EURASIP, AEG TELEFUNKEN), "Automatic Classification Of High Frequency Signals," *Signal Processing* 9 (1985) p. 1977-190.

F.F. LIEDTKE (FGAN), "Computer Simulation of an Automatic Classification Procedure for Digitally Modeled Communications Signals with Unknown Parameters", *Signal Processing* 6 (1984), p. 311-323;

Janet AISBETT (Electronics Research Laboratory, Defence Science and Technology Organization, Department of Defence, Australia), "Automatic Modulation Recognition", *Signal Processing* 13 (1987), p. 323-328;

T.G. CALLAGHAN WATKINS-JOHNSON, "Sampling and Algorithms and Modulation Recognition", *Microwaves and RF*, September 1985;

Jackie E. HIPP Ph.D (Southwest Research Institute, San Antonio, Tex.), "Modulation Classification Based on Statistical Moments", IEEE, 1986;

P.M. FABRIZA, L.B. LOPES and G.B. LOCKHART, "Receiver Recognition of Analogue Modulation Types".

These techniques do not, however, enable the recognition of transmissions simultaneously when the monitored frequency band is very extensive because the processed signals always come from demodulators which have limited passbands.

Furthermore, the precise acquisition of the carrier frequencies, which is generally done by means of frequency synthesizers, takes a length of time that is detrimental to the speed of the processing operations.

Also, according to other known methods, the classification of the transmissions takes place in implementing maximum likelihood algorithms applied to a determined number of parameters. These parameters result from a synthesis, whose perfection varies, of the information at the transmission of the information elements carried by each channel. This synthesis, which is designed to reduce the redundancy and interdependence of the parameters, is generally necessary to enable the application of special classification methods like the one, for example, known as the BAYES classification method. However, the algorithms that are implemented and necessary to reduce the redundancy and interdependence of the parameters require lengthy processing operations that take up computation time and are detrimental to the speed of the detections implemented.

SUMMARY OF THE INVENTION

The aim of the invention is to overcome the above-mentioned drawbacks.

According to the invention, there is proposed a method for the recognition of the modulation of radio-electrical transmissions from instantaneous spectra of transmission observed in a determined frequency band by a Fast Fourier Transform spectrum analyzer, consisting in:

computing the following parameters for each transmission spectrum line observed in the determined frequency band;

a mean amplitude of all the lines k of the spectra contained in the determined frequency band, a signal-to-noise ratio RSBk, a standard deviation ETk in amplitude of each line of the spectrum, and a coefficient of correlation COR(k,k) of amplitude of each line k with the homologous lines of the transmission spectra contained in the determined frequency band, making a comparison, through a network of neurons, of the parameters of each transmission spectrum with expected transmission parameters;

and declaring that a transmission corresponds to an expected transmission when the difference detected by the comparison between the parameters of the transmission and the expected parameters is the minimum.

BRIEF DESCRIPTION OF THE DRAWINGS

Other features and advantages of the invention shall appear from the following description, made with reference to the appended drawings, of which.

DETAILED DESCRIPTION OF THE INVENTION

Figure 1:
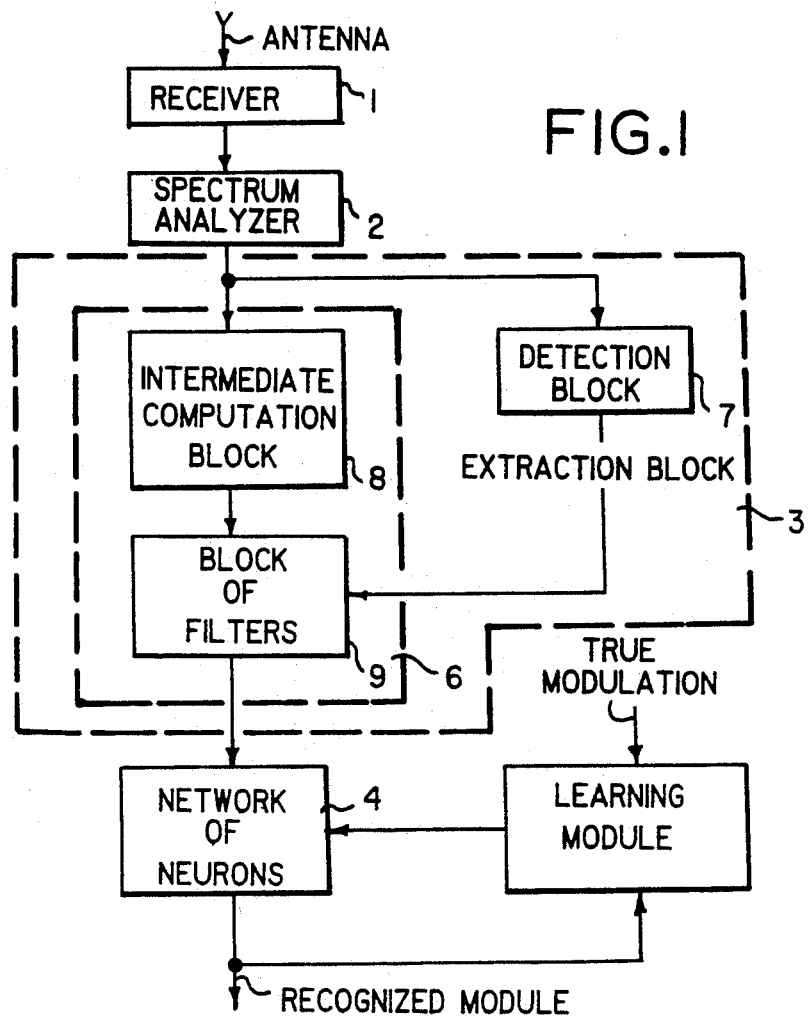
FIG. 1 shows an embodiment of a device according to the invention.

The device shown in FIG. 1 has a receiver 1, a spectrum analyzer 2, an extraction block 3, shown inside a box of dashes, a network of neurons 4 and a learning module 5. The extraction module 3 has a block 6 for the computation of primary parameters, shown within a box of dashes, and a detection block 7. The block 6 for the computation of primary parameters is formed by an intermediate computing block 8 and a block of filters 9.

The receiver 1 is a wideband radio receiver tuned to the center frequency of the frequency band to be analyzed. The signal picked up by the receiver is filtered in a known way at output of the intermediate frequency stages of this receiver. This receiver is made in a known way so as to pick up radiofrequency signals transmitted in the HF band standardized by the U.S. Federal Communications Commission (FFC). The standardized band ranges from 3 to 30 MHz corresponding to wavelengths of 100 to 10 meters, i.e. the decametric waveband. These signals may be modulated according to standardized modulations of the A0, A1, A3, A3H+, A3H−, A3J−, F3, F1 type. In a known way, the spectrum analyzer has an analog-digital converter and a computation block (not shown). The analog-digital converter gives 2N points resulting from the sampling, at the speed 2B, of the band of the signal to be analyzed.

The signal given by the analog/digital converter is also multiplied in a known way by a "four-term Blackman-Harris" type of weighting window.

The intermediate computation block 8 performs the computation of one in every two lines of the spectrum of the signal in applying a fast Fourier transform (FFT)

to the samples of the signal given by the weighting window, according to the methods described for example in the work by E. ORAN BRIGHAM, *The Fast Fourier Transform*, Prentice Hall Inc., Eaglewood Cliffs, N.J., 1974 and in the work by P.M. BEAUFILS and RAMI, *Le filtrage numerique*, SYBEX, pp. 117 to 135.

The resolution obtained is equal to two B/N.

The results of the FFT computation are given according to a period DeltaT and a resolution DeltaF that are well-determined (examples: DeltaT =2 to 8 ms, DeltaF =1 KHz to 250 KHz)

The extraction block is formed by parameter computation blocks 6 and the detection block 7 to enable the processing of all the transmissions of the band B in real time. The intermediate computation block 8 anticipates as far as possible the computation of the primary parameters by repetitive computations that are identical for all the channels and are independent of the transmissions presented in the band B of the receiver 1.

The detection block 7 makes a computation, on the basis of the results of the intermediate computations, of the position in the band B of the different transmitters (start, end) and it estimates the noise level NVB.

The filter block 9 uses the information elements of the intermediate computation and of the position of the emitters in the band B to compute the form vectors of each transmission constituted by the values of the primary parameters.

The extraction block 3 carries out these tasks periodically, the period being a multiple M of DeltaT. In fixing, for example, M at 300 spectra and DeltaT at 4 ms, the extraction period is then 1.2 seconds.

During each extraction period, the extraction block 3 computes, for each channel k of the band B, the signal-to-noise ratio RSB, the standard deviation in amplitude ETk and a coefficient of inter-line correlation COR k, k' of the channel k with a determined number of well-defined channels, for example a number equal to 9 such that k' =k +1 to k +9. This number also determines the bandwidth LB of each channel. These computations are done conjointly by the intermediate computation blocks 8, the detection block 7 and the filter 9 which are formed in a known way by appropriately programmed signal processors.

These processors are programmed to carry out operations for the computation of the signal-to-noise ratio RSBk of each channel k, the computations of the standard deviation ETk on the amplitude of each channel k and computations of the coefficient of correlation COR(k,k') between the variations in amplitude of the channels k and k'.

The computation of the signal-to-noise ratio RSBk for a channel k takes place in considering the amplitude $AM_k$ of the line k of each spectrum n and in computing the mean amplitude $A_{nk}$ of the line k during the extraction period according to the relationships:

$$AM_k = \frac{1}{M} \sum_{m=1}^{M} A_{m,k} \text{ en dBm} \quad (1)$$

and $$RSBk = AM_k - NVB \text{ in dBm} \quad (2)$$

where NVB corresponds to the mean noise level.

The computations of the standard deviation ETk of the parameters COR(k,k') take place in applying the relationships:

$$ETk = \left[ \frac{1}{M} \sum_{m=1}^{M} (A_{m,k} - AM_k)^2 \right]^{\frac{1}{2}} \quad (3)$$

$$COR(k,k') = \frac{\sum_{m=1}^{M} (A_{m,k} - AM_k)(A_{m,k'} - AM_{k'})}{\left[ \sum_{m=1}^{M} (A_{m,k} - AM_k)^2 \sum_{m=1}^{M} (A_{m,k'} - AM_{k'})^2 \right]^{\frac{1}{2}}} \quad (4)$$

The filter block 8 then selects N1 signal-to-noise ratio RSBk values, N2 standard deviation values ETk and N3 values of the correlation coefficients COR(k,k').

The selected channels are taken arbitrarily from the center of the transmission. If the transmission bandwidth is too low, the missing values are made good by mean quantities. For example, a possible choice may be determined as follows with N1 =7, N2 =5 and N3 =10.

Figure 2:
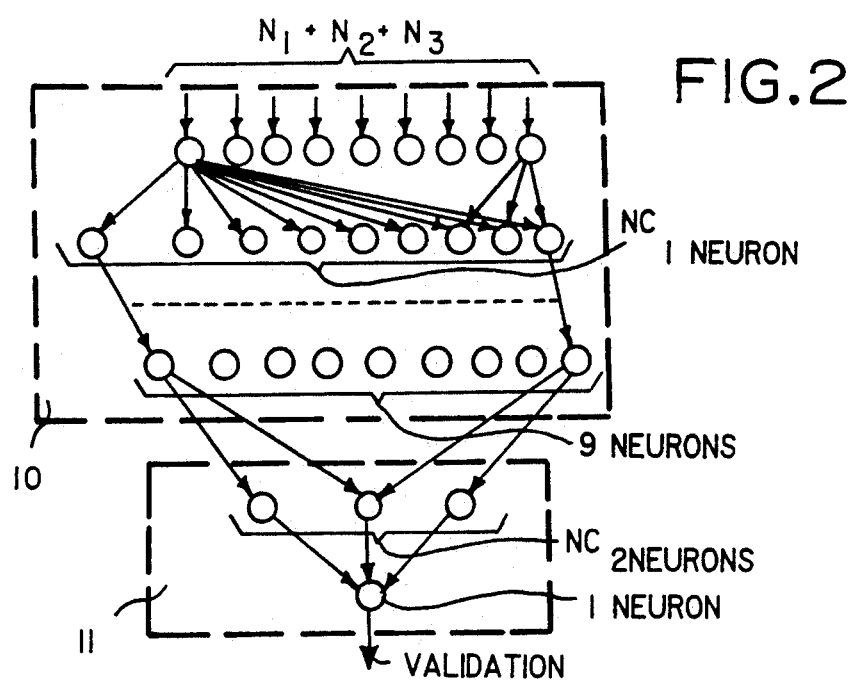
FIG. 2 shows a mode of organization of the network of neurons of FIG. 1.
Figure 3:
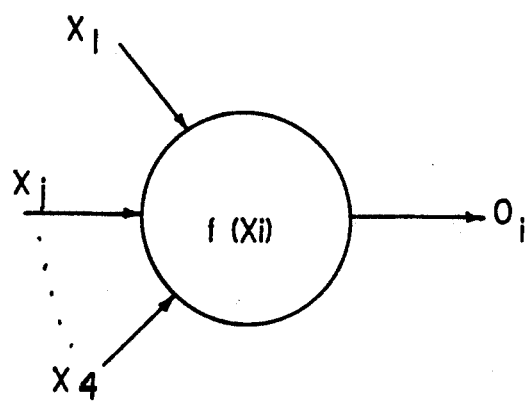
FIG. 3 shows a schematic drawing of a neuron.
Figure 4:
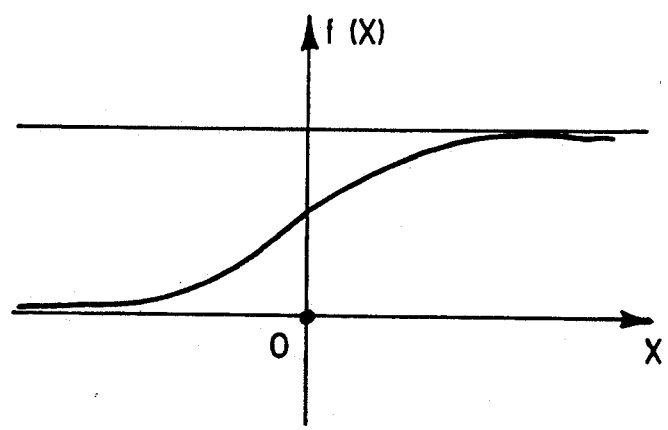
FIG. 4 shows a response curve of a neuron.

One embodiment of the network of neurons 4 is shown in FIG. 2. This network has two sub-networks 10 and 11. The sub-network 10 also has NC1 concealed neurons as well as 9 output neurons, one per type of modulation. The sub-network 11 is coupled to the first sub-network 10 and has nine inputs corresponding to the nine outputs of the sub-network 10, NC2 concealed neurons and one output corresponding to the validation information. In the architecture shown in FIG. 3, each neuron used is a known type of sygmoid neuron, a schematic drawing of which is shown in FIG. 4. According to this type of organization, the electrical state of the output of a neuron is defined as a function of the state of these inputs by a relationship of the form:

$$O_i = \frac{1}{1 + \text{Exp}\left(-\sum_{j=i}^{N_i} \text{Omega}_{ji} \cdot X_j - \text{Theta}_i\right)} \quad (5)$$

where:
 $O_i$ designates the output of the neuron i,
 Theta $_i$ designates the threshold associated with the neurone i,
 $X_j$ designates the input j of the neuron i,
 $N_i$ is the number of inputs of the neuron i,
 and Omega $_{ji}$ designates the weight assigned to the input j.

On the basis of the parameters coming from the filter block 9, the network computes the outputs of all the neurones by applying the relationship (5).

The type of modulation found is that for which the associated neuron has a maximum output signal level. On the basis of the outputs of the sub-network 10, the sub-network 11 computes a validation information. If this validation information is above a threshold S, the recognition is validated. If not, there is a rejection. The learning carried out by the learning block 5 is of the retro-propagation type described in the the article on the same subject by Rummel Hartington WILLIAMS, "Distributed Processing", 1986. In this learning method, for each input presented, the output of the network is compared with the expected output. The difference constitutes an error vector used to correct the weight Omega$_{ji}$ of the output neurons.

The error is then retro-progagated according to a gradient type of algorithm. The corrections are then made from the output towards the input of the network. The learning takes place first of all in correcting the coefficients Omega$_{ji}$ of the sub-network 10, then those of the sub-network 11.

We claim:

1. A method for the recognition of the modulation of radioelectric transmissions from instantaneous spectra of transmission observed in a determined frequency band by a Fast Fourier Transform spectrum analyzer, said method comprising the steps of, for each transmission spectrum line observed in the determined frequency band:

calculating a mean amplitude parameter of all the line k of the spectra contained in the determined frequency band;

calculating a signal-to-noise ratio parameters RSBk;

calculating a standard deviation parameter ETk in amplitude of each line of the spectrum;

calculating a coefficient of correlation parameter COR(k,k) of each amplitude of each line k with the homologous lines of the transmission spectra contained in the determined frequency band, said method subsequently further including making a comparison, through a network of neurons, of results of said calculated parameters of each transmission spectrum with expected transmission parameters and indicating a correspondence between a transmission and an expected transmission when the difference detected by said comparison is at minimum values.

2. A method according to claim 1 consisting in associating, in the network of neurons, a neuron with each type of modulation.

3. A method according to claim 2, consisting in declaring that a type of modulation is found when the output level of the associated neuron is the maximum.

4. A method according to claim 3 consisting in determining the output level Oi of a neuron by a relationship of the form:

$$O_i = \frac{1}{1 + \mathrm{Exp}\left(-\sum_{j=1}^{N_i} \mathrm{Omega}_{ij} X_j - \mathrm{Theta}_i\right)}$$

where

Theta $_i$ designates a threshold associated with the neurone i,

X designates an input j,

N$_i$ is the number of inputs of the neuron i, and Omega$_{ji}$ designates the weight assigned to the input j.

5. A method according to claim 3, consisting in the determining of the output level O$_i$ of a neuron by a relationship of the form:

$$O_i = \mathrm{SIGN}\left(\sum_{j=1}^{N_i} \mathrm{Omega}_{ij} X_j - \mathrm{Theta}_i\right)$$

where

Theta $_i$ designates a threshold associated with the neurone i,

X$_j$ designates an input j,

N$_i$ is the number of inputs of the neuron i, and

Omega$_{ji}$ designates the weight assigned to the input j.

6. A method according to claim 4 consisting of the adjusting, in a learning phase, of the weight Omega$_{ij}$ of each neuron corresponding to an expected type of transmission in comparing, for each expected transmission, the output of the network with the expected output in retro-propagating the error obtained according to a gradient type of algorithm which minimizes this error.

7. A device for recognizing modulation of radioelectric transmissions from instantaneous spectra of transmissions observed in a determined frequency band by Fast Fourier Transform, comprising:

a receiver coupled to a network of neurons by means of a spectrum analyzer; and a device for extracting transmission parameters including the mean amplitude of all lines k of the spectra contained in the determined frequency band and a signal-to-noise ratio RSBk, and a standard deviation ETk in amplitude of each line of the spectrum and a coefficient of correlation COR(k,k) of amplitude of each line k with the homologous lines of the transmission spectra contained in the determined frequency band.

8. A device according to claim 7, wherein the extracting device comprises a block of filters for the determining of primary transmission parameters coupled with an intermediate computation block and a transmission detection block.

9. A device according to claim 8, wherein the block of filters, the intermediate computation block and the transmission detection block are formed by signal processors.

10. A device according to claim 9, wherein the signal processors are programmed to compute, for each transmission spectrum line k, a mean amplitude of the order k lines of the spectra contained in the frequency band, a signal-to-noise ratio RSBk, a standard deviation ETk in amplitude and a coefficient of correlation COR(k,k) of amplitude with the homologous lines of the transmission spectra contained in the frequency band.

* * * * *